United States Patent
Decke et al.

(10) Patent No.: US 11,167,723 B2
(45) Date of Patent: Nov. 9, 2021

(54) METHOD FOR ACCESS MANAGEMENT OF A VEHICLE

(71) Applicant: VOLKSWAGEN AG, Wolfsburg (DE)

(72) Inventors: Hendrik Decke, Braunschweig (DE); André Oberschachtsiek, Braunschweig (DE)

(73) Assignee: Volkswagen AG

( * ) Notice: Subject to any disclaimer, the term of this patent is extended or adjusted under 35 U.S.C. 154(b) by 0 days.

(21) Appl. No.: 15/710,082

(22) Filed: Sep. 20, 2017

(65) Prior Publication Data
US 2018/0093641 A1    Apr. 5, 2018

(30) Foreign Application Priority Data
Sep. 30, 2016   (DE) .......... 10 2016 218 986

(51) Int. Cl.
*B60R 25/24*    (2013.01)
*H04L 9/32*     (2006.01)
*G07C 9/00*     (2020.01)

(52) U.S. Cl.
CPC .......... *B60R 25/24* (2013.01); *G07C 9/00* (2013.01); *H04L 9/3226* (2013.01);
(Continued)

(58) Field of Classification Search
CPC ........ B60R 2325/108; B60R 2325/205; B60R 25/24; G07C 9/00; H04L 2209/80; H04L 9/3226; B60N 2/62; B60N 2/0284; B60N 2/70; B60N 2205/30; B60N 2205/35; B60N 2/0232; B60N 2/929; B60N 2002/924; B60N 2/02; B60N 2/5664; B60N 2/933; B60N 2/995; B60N 2002/0236; B60N 2/002; B60N 2/0292; B60N 2/502; B60N 2/54; B60N 2/58; B60N 2/68; B60N 2/686; B60N 2/72; B60N 2/99; G06F 16/285; G06F 17/00; G06F 3/0482
(Continued)

(56) References Cited

U.S. PATENT DOCUMENTS

2002/0133716 A1* 9/2002 Harif ................ G07C 9/00103
                                                         726/9
2002/0152180 A1* 10/2002 Turgeon ................ G06Q 20/04
                                                         705/72
(Continued)

FOREIGN PATENT DOCUMENTS

CN    104691499 A    6/2015
CN    105046830 A    11/2015
(Continued)

OTHER PUBLICATIONS

Office Action for Chinese Patent Application No. 201710930334.2; dated Mar. 18, 2020.

*Primary Examiner* — Yong Hang Jiang
(74) *Attorney, Agent, or Firm* — Barnes & Thornburg LLP

(57) ABSTRACT

A method for access management of the vehicle providing a vehicle and authenticating a user in relation to the vehicle by a proof of identity of the user. The method includes providing a cryptographically secured authorization file for the vehicle containing information relating to usage rights of the authenticated user to the vehicle to increase security in the entity-related enabling of vehicle functions.

26 Claims, 2 Drawing Sheets

(52) U.S. Cl.
CPC ... *B60R 2325/108* (2013.01); *B60R 2325/205* (2013.01); *G07C 9/00571* (2013.01); *G07C 2009/00507* (2013.01); *H04L 2209/80* (2013.01)

(58) Field of Classification Search
USPC .................................. 340/5.1, 5.2, 5.7, 5.72
See application file for complete search history.

(56) References Cited

U.S. PATENT DOCUMENTS

| | | | | |
|---|---|---|---|---|
| 2007/0043950 | A1* | 2/2007 | Imanishi | H04L 9/3263 713/176 |
| 2007/0294746 | A1* | 12/2007 | Sasakura | B60R 25/2018 726/2 |
| 2009/0251279 | A1* | 10/2009 | Spangenberg | B60R 25/2018 340/5.7 |
| 2010/0176919 | A1* | 7/2010 | Myers | G07C 9/00571 340/5.73 |
| 2011/0153375 | A1* | 6/2011 | Weinstock | G06Q 50/30 705/5 |
| 2012/0304314 | A1* | 11/2012 | Atzkern | G06F 21/105 726/29 |
| 2014/0006247 | A1* | 1/2014 | Chai | G06Q 40/04 705/37 |
| 2014/0365781 | A1* | 12/2014 | Dmitrienko | G06F 21/34 713/185 |
| 2016/0147990 | A1* | 5/2016 | Schneider | G06F 21/44 726/19 |
| 2017/0142589 | A1* | 5/2017 | Park | H04W 12/08 |

FOREIGN PATENT DOCUMENTS

| | | | |
|---|---|---|---|
| CN | 105704090 A | 6/2016 | |
| CN | 105763586 A | 7/2016 | |
| CN | 105847282 A | 8/2016 | |
| CN | 105894679 A | 8/2016 | |
| DE | 10321750 A1 | 3/2004 | |
| DE | 102012012389 A1 | 1/2013 | |
| DE | 102011118234 A1 | 5/2013 | |
| DE | 102012013450 A1 | 1/2014 | |
| DE | 102013225106 A1 | 6/2015 | |
| DE | 102014001038 A1 | 7/2015 | |
| DE | 102014107242 A1 | 11/2015 | |
| DE | 102014212758 A1 | 1/2016 | |
| DE | 112011105869 B4 | 10/2016 | |
| EP | 2743868 A1 | 6/2014 | |
| EP | 2969667 A1 * | 1/2016 | ............ B60R 25/04 |

* cited by examiner

METHOD FOR ACCESS MANAGEMENT OF A VEHICLE

PRIORITY CLAIM

This patent application claims priority to German Patent Application No. 10 2016 218 986.7, filed 30 Sep. 2016, the disclosure of which is incorporated herein by reference in its entirety.

SUMMARY

Illustrative embodiments relate to a method for access management of a vehicle and a communication system.

BRIEF DESCRIPTION OF THE DRAWINGS

Disclosed embodiments are explained below with reference to the associated drawings. In the drawings.

DETAILED DESCRIPTION

Figure 1:
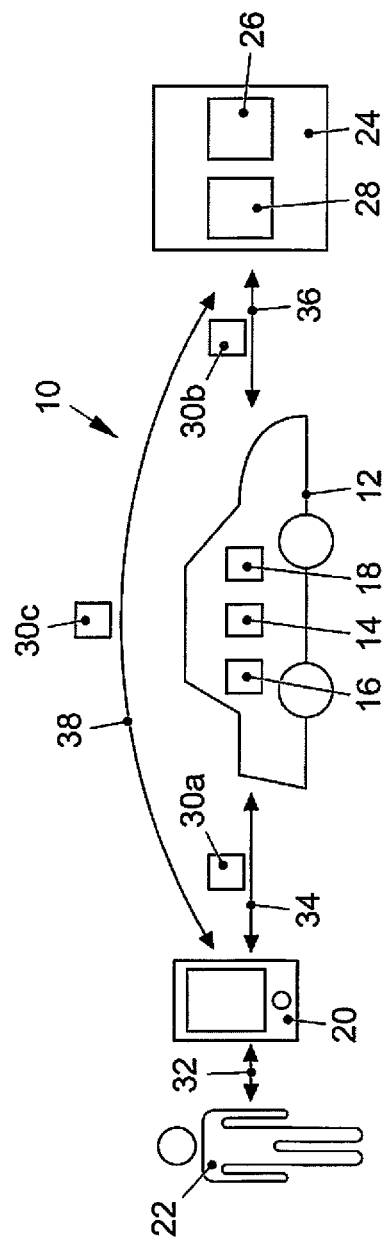
FIG. 1 shows an exemplary embodiment of the communication system.

In the access management of a vehicle, an electronic device, such as, for example, an electronic vehicle key or a mobile terminal device, is normally recognized by a corresponding device inside the vehicle, so that functions of the vehicle are enabled based on the recognized electronic device.

So that an electronic device can be used to access a vehicle, a cryptographic key needs to be stored in a secure memory of the electronic device. However, the writing of secure memories requires separate access rights, so that a user cannot perform this himself. If the electronic device is to be used for different vehicles over a certain time period, the need for repeated access to the secure memory of the electronic device ultimately incurs high costs for the user.

A different approach involves the authentication of the user to the vehicle. For this purpose, document DE 10 2014 212 758 A1 proposes a method which serves to identify the driver of a vehicle. Here, not only is the extent to which the driver is authorized to drive the vehicle determined, but also the facility is provided to adapt settings of the vehicle automatically to individual users of the vehicle.

A method for recording the identity of a vehicle occupant is furthermore known from document DE 103 21 750 A1, wherein an occupant sensor is used to obtain an image of a part of the body of the vehicle occupant to identify the vehicle occupant. The method comprises the comparison of the image obtained from the part of the body with at least one stored image of a part of the body and the establishment of whether the image obtained from the part of the body matches the stored image to identify the vehicle occupant.

Document DE 10 2014 001 038 A1 furthermore proposes a method for transmitting data to a vehicle, wherein the data are successfully transmitted only by a unique electronic identity and a code is selected as an electronic identity, the code being generated using a vehicle identification number of a respective vehicle and an identity of a respective user, and thereby being allocated to the one vehicle and to the user.

Document DE 10 2014 107 242 A1 furthermore discloses a method for controlling access to a vehicle, wherein the vehicle is equipped with an access control unit which can deny and allow access to functions of the vehicle. A user can set up a communication connection via a mobile access unit to the access control unit. In the event of access, an identity check of the user is carried out, wherein the user identifies himself to the mobile access unit. Access rights for the vehicle are then determined and granted.

Document DE 10 2013 225 106 A1 describes a method for access control and usage control of a motor vehicle. In the method, an input of a user into an input device of the motor vehicle is compared with a non-plaintext representation of an authentication code contained in a soft token as a prerequisite for the output of a signal to override an immobilizer of the motor vehicle.

Document DE 10 2011 118 234 A1 describes a method for enabling a technical apparatus. By the disclosed method, registered, authenticated users can make a reservation for the technical apparatus via a mobile terminal.

Document DE 10 2012 012 389 A1 describes an apparatus for controlling an access authorization and/or driving authorization for a vehicle. The apparatus comprises a mobile communication device and a control unit in the vehicle which receives and checks authorization data transmitted from the mobile communication device.

Document DE 10 2012 013 450 A1 describes a method for controlling an access authorization or driving authorization for a vehicle. In the method, access or driving authorization data for the access authorization or driving authorization are requested from a database server by a mobile communication device.

Document DE 11 2011 105 869 T5 describes an electronic key system which can perform the unlocking of a door without inserting a key.

However, known solutions, in which a user authentication is performed in relation to the vehicle, have considerable security vulnerabilities in the enablement of vehicle functions following a successful authentication.

Disclosed embodiments increase security in the entity-related enablement of vehicle functions. Disclosed embodiments provide a method and a communication system.

The disclosed method for access management of a vehicle comprises the provision of a vehicle and the authentication of a user in relation to the vehicle by a proof of identity of the user. According to the disclosed embodiments, a cryptographically secured authorization file for the vehicle is provided, containing information relating to usage rights of the authenticated user in respect of the vehicle. The cryptographically secured authorization file may be cryptographically protected against modification and/or interception by unauthorized third parties.

The disclosed method offers the benefit that, on the one hand, the authentication does not focus on a legitimizing device, but on the user himself, and, on the other hand, through the provision of a cryptographically secured authorization file which contains information relating to usage rights of the authenticated user in respect of the vehicle, this high level of security is maintained once the authentication is completed. The security in the entity-related enabling of vehicle functions is thus considerably increased. Furthermore, the type of authentication that is used enables the secure enabling of person-related mobile online services.

The method may comprise the checking of the cryptographically secured authorization file by the vehicle and/or the enabling of vehicle functions based on the provided cryptographically secured authorization file. The checking of the cryptographically secured authorization file comprises the checking of the cryptographically secured authorization file for authenticity and/or validity. If no signal-conducting connection to a different checking instance, such as, for example, a central computer of a vehicle manufacturer or a third-party provider is available, vehicle functions can be enabled for a user by a checking of the cryptographically secured authorization file by the vehicle. Situations of this type occur, for example, if the vehicle is located in an underground car park or at a remote location without mobile reception, so that no Internet connection can be set up to a different checking instance which is located remotely from the vehicle.

The method may comprise the provision of a mobile terminal device on which a cryptographically secured secret is stored and which is configured to communicate with the vehicle, wherein the proof of identity may be provided using the cryptographically secured secret on the mobile terminal device. The mobile terminal device may, for example, be a Smartphone, a tablet, a smartwatch, an electronic vehicle key or a smartcard. In the case of a smartcard, this may be operated via a corresponding terminal. The mobile terminal device may have a secure memory, wherein the cryptographically secured secret is stored in the secure memory of the mobile terminal device. Biometric features of the user or data derived therefrom which are used in the proof of identity can also be stored in the secure memory. The secure memory of the mobile terminal device may be writable and/or updatable by a vehicle manufacturer or a third-party provider. The communication between the vehicle and the mobile terminal device may be implemented in a wireless and/or wired manner. The vehicle and the mobile terminal device communicate via a radio link, for example, via BLUETOOTH®. The mobile terminal device may have one or more keys, a display and/or a touchscreen. The mobile terminal device is configured to communicate with further devices in a wireless and/or wired manner. The authorization file and/or other information on the mobile terminal device can thereby be updated. The cryptographically secured secret may be uniquely allocated to a user and is thus suitable for proving the identity of a person so that the proof of identity can be provided indirectly via the cryptographically secured secret on the mobile terminal device.

The authentication of the user in relation to the vehicle by a proof of identity of the user may comprise the provision of a digital identity which is uniquely allocated to the user, and/or the linking of the digital identity to the mobile terminal device. The cryptographically secured secret on the mobile terminal device may comprise information relating to the digital identity of the user. The proof of identity may be provided through proof of the digital identity. Due to the proof of a digital identity, a biometric proof of identity directly on the vehicle, for example, based on an iris scan or a fingerprint scan, is no longer required. The authentication procedure is thus simplified and speeded up.

The digital identity may comprise a user account and/or an identification number. Alternatively or additionally, the linking of the digital identity to the mobile terminal device may comprise the login of the user into a user account via the mobile terminal device, through the input of a username and/or a password and/or the input of the identification number on the mobile terminal device. The mobile terminal device may have a cryptographically secured secret belonging to the user account which serves as proof of the identity of the user. This may, for example, be the private key of an asymmetric cryptographic key pair.

The proof of identity may also be implemented using biometric features of the user or data derived therefrom. The authentication of the user in relation to the vehicle by a proof of identity of the user may comprise the provision of biometric features of the user or data derived therefrom for the vehicle. The biometric features of the user or the data derived therefrom may, for example, be recorded and/or created, for example, by a corresponding device on the vehicle and/or on the mobile terminal device immediately before their provision. Alternatively, the biometric features of the user or the data derived therefrom can be stored on the mobile terminal device or on a different data medium and can be provided to the vehicle by a data transmission. The biometric features of the user or the data derived therefrom may not be stored directly, but rather in a modified form, for example, as hash values. The security level of the authentication is again increased through the use of biometric features of the user or data derived therefrom.

The provision of the cryptographically secured authorization file for the vehicle can be initiated by an event. Alternatively or additionally, the checking of the cryptographically secured authorization file by the vehicle may be initiated by an event. The event may, for example, be the recording of a user by the vehicle and/or the mobile terminal device, wherein the user can be recorded by the vehicle and/or the mobile terminal through the recording of a login procedure to a user account. The event may also be the determination of an interim performance of an update and/or modification of an authorization file already present in the vehicle. Alternatively or additionally, the provision of the cryptographically secured authorization file for the vehicle and/or the checking of the cryptographically secured authorization by the vehicle is/are performed at least temporarily at regular time intervals.

The cryptographically secured authorization file may be cryptographically signed and/or cryptographically encrypted. The cryptographic signature that is used may comprise, for example, a certificate. The certificate may have been drawn up and/or issued by an approved certification body. The security level is again increased as a result. The encryption of the cryptographically secured authorization file may be performed in such a way that only one vehicle or one group of vehicles is configured to decrypt the encryption that is used. If the authorization file entitles the user to use vehicle functions of a plurality of vehicles, for example, in a car sharing arrangement, it is beneficial if the cryptographically secured authorization file can be decrypted and/or verified by a plurality of vehicles.

The cryptographically secured authorization file may comprise information relating to the identity of the vehicle, the scope of the usage rights of the authenticated user and/or the identity of the authenticated user. The authorization file may also contain information indicating whether the user is authorized to allocate usage authorizations to other users. The usage rights may comprise the locking or unlocking of locking units of the vehicle, the opening or the closing of vehicle doors, the activation or deactivation of the vehicle ignition, the setting of heating or cooling devices, such as, for example, for the passenger compartment temperature control or the temperature control of components of the vehicle, such as the front or rear windshield, one or more vehicle seats, a battery unit or electronic components inside the vehicle, the setting of seat configurations, the setting of lighting units or the actuation of the vehicle horn. The information relating to the identity of the vehicle may comprise the vehicle identification number, the year of manufacture, the vehicle manufacturer and/or the vehicle model. The information relating to the identity of the authenticated user may comprise the name, the address, the place of birth, the date of birth and/or biometric features of the authenticated user or data derived therefrom. The cryptographically secured authorization file may be configured to grant usage rights in a person-dependent manner, and therefore independently from a vehicle. Alternatively, the cryptographically secured authorization file is configured to grant usage rights in a person-independent manner. To do this, it is recorded in the cryptographically secured authorization file that the usage rights are intended to apply in either a vehicle-independent or user-independent manner. The cryptographically secured authorization file may also be configured to enable and/or to disable vehicle functions temporarily or permanently.

The cryptographically secured authorization file may furthermore contain information relating to usage rights, ownership rights, and/or possession rights of the authenticated user. For example, the usage rights, ownership rights and/or possession rights of the authenticated user relate to buildings and/or parts of buildings, such as, for example, houses or apartments, online services and/or payment services. User rights which are not directly related to the vehicle can therefore also be managed by the cryptographically secured authorization file.

The cryptographically secured authorization file may be provided to the vehicle by the mobile terminal device and/or a different mobile data medium. The communication between the mobile terminal device or the different mobile data medium and the vehicle may be performed in a wireless or wired manner. The communication between the mobile terminal device or the different mobile data medium and the vehicle is performed by a radio link, such as, for example, BLUETOOTH®. If the vehicle is not connected to the Internet, a cryptographically secured authorization file can thus be provided to the vehicle. The user can therefore make use of his authorizations to use the vehicle, for example, even in underground car parks or remote locations without mobile reception.

The cryptographically secured authorization file can be provided to the vehicle by a central computer. The central computer may, for example, be a backend of a vehicle manufacturer or third-party provider. The vehicle is connected to the central computer via a radio link, optionally via an Internet link. The user may, for example, prompt the central computer, via the mobile terminal device, to provide the vehicle with a cryptographically secured authorization file. Alternatively or additionally, a vehicle manufacturer or third-party provider may instigate the provision of a cryptographically secured authorization file for the vehicle. The instigation of the provision of a cryptographically secured authorization file by the central computer may be beneficial, for example, if the user has acquired new usage rights to the vehicle and/or usage rights to the vehicle have been withheld from the user.

The vehicle may at least temporarily store received cryptographically secured authorization files. If the vehicle is not able to receive an up-to-date cryptographically secured authorization file, the user can use the vehicle based on a cryptographically secured authorization file previously transferred to the vehicle. The cryptographically secured authorization file for the vehicle may be provided simultaneously or immediately after the authentication of the user in relation to the vehicle by the proof of identity of the user. In at least one disclosed embodiment for the authentication, an asymmetric cryptographic key pair which is uniquely allocated to the user is installed on the mobile terminal device. If the user possesses a plurality of mobile terminal devices, the same key pair may be stored on each of these mobile terminal devices. The authentication of the user in relation to the vehicle may be performed by a challenge-response method. The authentication of the user in relation to the vehicle may be initiated without active use of the mobile terminal device by the user. The user may thus, for example, approach the vehicle with the mobile terminal device and authenticate himself automatically by a procedure such as a passive-entry system.

The method may furthermore comprise the creation of a cryptographically secured authorization file by the mobile terminal device and/or the provision of a cryptographically secured authorization file for a third-party device by the mobile terminal device. A user may thus use a third-party device, which may also be a simple data medium in card format, for the authentication if the information required for the proof of identity, such as, for example, a cryptographic key pair, has been transferred onto the third-party device. In the case of a cryptographic key pair, the public key can be registered as an attribute in the authorization file of the user and would thus be recognized as an authentication feature by the vehicle. If a user account is used, the third-party device can still be connected via an additional login process to the user account. A new cryptographically secured authorization file is then issued which links the key pair of the third-party device to the user account and therefore to the original key pair. Similarly, the vehicle must then also be able to communicate with the third-party device.

The method may comprise the provision of a central computer which is configured to communicate with the mobile terminal device and/or the vehicle, the creation of a cryptographically secured authorization file by the central computer, the provision of a cryptographically secured authorization file by the central computer and/or the checking by the central computer of a cryptographically secured authorization file which has been provided to the vehicle. The central computer is a backend of a vehicle manufacturer or third-party provider. The central computer can communicate with the mobile terminal device and/or the vehicle via a radio link, via an Internet link. The central computer may comprise an authorization management which manages and stores a plurality of vehicles and the usage rights of the individual users in respect of the individual vehicles and provides the information as retrievable cryptographically secured authorization files. The central computer may comprise one or more identity providers. The one or more identity providers manage the identities of the different users, vehicles and vehicle functions and also store authentication features such as usernames, passwords or other features. The authorization management can manage the relations between the users, vehicles and vehicle functions.

The authentication of the user in relation to the vehicle by a proof of identity of the user, the provision of the cryptographically secured authorization file for the vehicle and the checking of the cryptographically secured authorization file by the central computer can take place in succession or in parallel and furthermore in different sequences and combinations. If, for example, the vehicle already has an older authorization file of the user, the authentication of the user in relation to the vehicle can first be performed, for example, by a proof of identity of the user, the cryptographically secured authorization file for the vehicle can then be provided and the cryptographically secured authorization file can then be checked thereafter by the central computer. If the login is performed by a third-party device, the cryptographically secured authorization file can first be provided to the vehicle, the authorization file can then be checked by the central computer before the user is authenticated in relation to the vehicle by a proof of identity of the user. Other procedural sequences may furthermore be beneficial, depending on the situation.

The disclosed communication system comprises a vehicle and an authentication device which is configured to authenticate a user in relation to the vehicle by a proof of identity of the user. The communication system is configured to carry out the method for access management of a vehicle according to at least one of the embodiments described above. The authentication device may, for example, be a mobile terminal device or a central computer. The same benefits and modifications apply as previously described in relation to the method.

The different embodiments of the disclosure specified in this application are combinable with one another, unless otherwise stated in individual cases.

FIG. 1 shows a communication system 10 with a vehicle 12, a mobile terminal device 20 and a central computer 24.

The vehicle 12 comprises a first communication module 16, a second communication module 18 and a control device 14. The first communication module 16 and the second communication module 18 have a signal-conducting connection to the control device 14, wherein the control device 14 is configured to control the first communication module 16 and the second communication module 18. The first communication module 16 is configured to communicate with the mobile terminal device 20 wirelessly using BLUETOOTH® via the communication connection 34. The second communication module 18 is configured to communicate with the central computer 24 wirelessly via the communication connection 36. The communication connection 36 is a mobile-based Internet connection.

The mobile terminal device 20 can be operated by a user 22 via an operating unit 32. The mobile terminal device 20 is designed as a Smartphone and serves as an authentication device by which the user 22 can authenticate himself in relation to the vehicle 12. The authentication is performed via a proof of identity of the user 22. To provide the proof of identity, the user 22 provides the vehicle 12 via the mobile terminal device 20 with a digital identity which is uniquely allocated to the user 22.

Once the authentication of the user 22 is completed, a cryptographically secured authorization file 30a containing information relating to usage rights of the user 22 to the vehicle 12 is provided to the vehicle 12 by the mobile terminal device 20. The vehicle 12 checks the received cryptographically secured authorization file 30a and enables the functions of the vehicle 12 indicated in the cryptographically secured authorization file 30a for the user 22.

The vehicle 12 then transmits the received cryptographically secured authorization file 30a to the central computer 24 (shown with reference 30b). The vehicle 12 can authenticate itself to the central computer 24, for example, through additional signing of the authorization file 30a and/or through reciprocal authentication, for example, via Transport Layer Security (TLS). The central computer 24 comprises an authorization management 26 and an identity provider 28. The authorization management 26 manages and stores a plurality of users, including the user 22, a plurality of vehicles, including the vehicle 12, and the usage rights of the individual users to the individual vehicles, including the usage rights of the user 22 to the vehicle 12. This information is provided as retrievable cryptographically secured authorization files so that the central computer 24, for example, can also provide the mobile terminal device 20 with a corresponding authorization file 30c. The identity provider 28 manages identities of different users, vehicles and vehicle functions and also stores authentication features such as usernames and passwords. The authorization management 26 is configured to manage the relations between the users, vehicles and vehicle functions.

Figure 2:
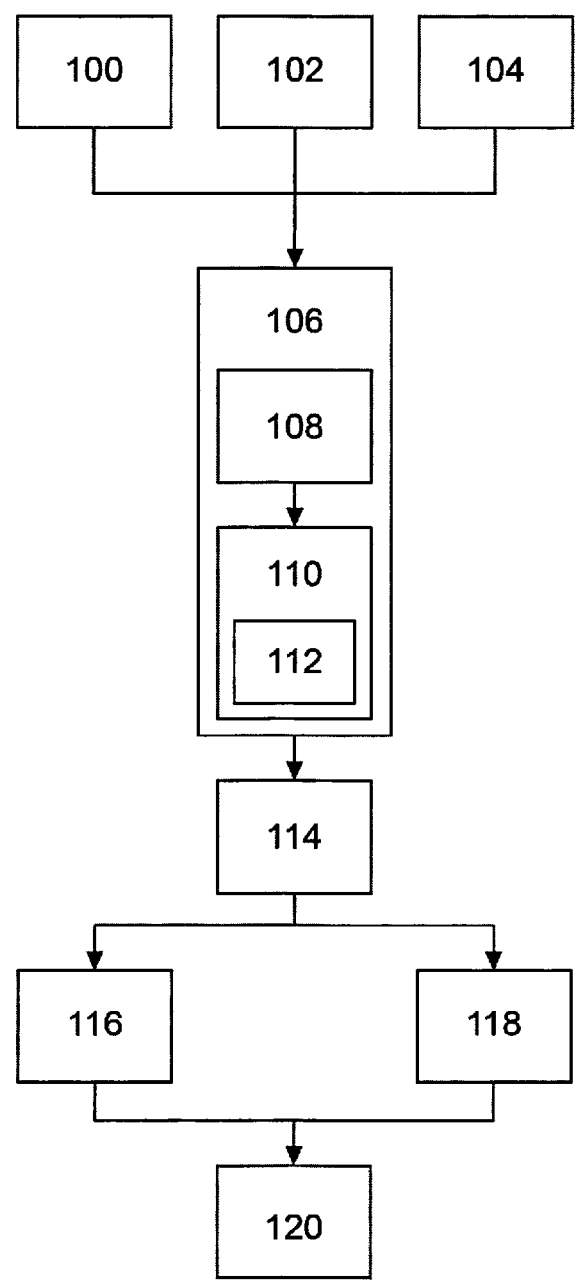
FIG. 2 shows an exemplary embodiment of the disclosed method for access management of a vehicle in a block representation.

FIG. 2 shows a method for access management of a vehicle 12. The method is introduced with the following three operations:

100) provision of a vehicle 12;
102) provision of a mobile terminal device 20; and
104) provision of a central computer 24.

A cryptographically secured secret is stored on the mobile terminal device 20. The vehicle 12, the mobile terminal device 20 and the central computer 24 are configured to communicate with one another. After the vehicle 12, the mobile terminal device 20 and the central computer 24 have been provided, the following operation is carried out:

106) authentication of a user 22 in relation to the vehicle 12 by a proof of identity of the user 22.

The authentication of the user 22 in relation to the vehicle 12 is initiated without active use of the mobile terminal device 20 by the user 22 in the manner of a passive-entry system and is performed by a challenge-response method.

The authentication of the user 22 in relation to the vehicle 12 by a proof of identity of the user 22 furthermore comprises the following two operations:

108) provision of a digital identity which is uniquely allocated to the user 22; and
110) linking of the digital identity to the mobile terminal device.

The cryptographically secured secret on the mobile terminal device 20 comprises the information relating to the digital identity of the user 22, wherein the digital identity comprises a user account. The linking of the digital identity to the mobile terminal device 20 furthermore comprises the following operation:

112) login of the user 22 into a user account via the mobile terminal device 20, i.e., through the input of a username and password.

Once the authentication of the user 22 in relation to the vehicle 12 has been successfully completed, the following operation can be carried out:

114) provision of a cryptographically secured authorization file 30a-30c for the vehicle 12 containing information relating to usage rights of the authenticated user 22 to the vehicle 12.

The cryptographically secured authorization file 30a-30c is provided to the vehicle 12 by the mobile terminal device 20, wherein the cryptographically secured authorization file 30a-30c for the vehicle 12 is provided immediately after the authentication of the user 22 in relation to the vehicle 12.

The authorization file 30a-30c is cryptographically protected against modification and interception, i.e., by cryptographically signing and cryptographically encrypting the cryptographically secured authorization file. The cryptographically secured authorization file 30a-30c furthermore comprises information relating to the identity of the vehicle 12, the scope of the usage rights of the authenticated user 22 and the identity of the authenticated user 22. The vehicle 12 is configured to temporarily store received cryptographically secured authorization files 30a-30c.

After the cryptographically secured authorization file 30a-30c has been provided to the vehicle 12, the following operations are carried out:

116) checking of the cryptographically secured authorization file 30a-30c by the vehicle 12; and 118) checking by the central computer 24 of the cryptographically secured authorization file 30a-30c which has been provided to the vehicle 12.

The cryptographically secured authorization file has been provided to the central computer 24 by the vehicle 12 so that it can be checked by the central computer 24. A check can be carried out by the central computer 24 to determine whether one or more certificates which the authorization file contains are still valid. The vehicle 12 is configured to be able to check the authorization file 30a-30c independently from the central computer 24, so that a check of the authorization file 30a-30c can take place even in cases where no connection to the central computer 24 exists. The method is concluded by the following operation:

120) enabling of vehicle functions based on the provided cryptographically secured authorization file 30a-30c.

Since the vehicle has been provided with a cryptographically secured authorization file containing information relating to usage rights of an authenticated user to the vehicle, the disclosure allows a substantial increase in security in the entity-related enabling of vehicle functions.

REFERENCE NUMBER LIST

10 Communication system
12 Vehicle
14 Control device
16 Communication module
18 Communication module
20 mobile terminal
22 User
24 Central computer
26 Authorization management
28 Identity provider
30a-30c Authorization files
32 Operating unit
34-38 Communication connections
100-120 Method operations

The invention claimed is:

1. A computer implemented method for access management of a vehicle, the method comprising:
providing a mobile terminal device on which a cryptographically secured secret is stored and which communicates with the vehicle;
authenticating a user for managing access to the vehicle by a proof of identity of the user, wherein the proof of identity is provided using the cryptographically secured secret on the mobile terminal device;
providing a central computer which communicates with the mobile terminal device and/or the vehicle;
in response to authentication of the user, creating a cryptographically secured authorization file by the central computer, wherein the secured authorization file contains information defining a scope of authenticated user-dependent usage rights specific to the authenticated user, wherein the cryptographically secured authorization file is configured to grant user rights that are independent of the vehicle for which access is being managed; and
providing the cryptographically secured authorization file by the central computer to the vehicle to manage access to the vehicle.

2. The method of claim 1, further comprising:
checking the cryptographically secured authorization file by the vehicle; and
enabling vehicle functions based on the provided cryptographically secured authorization file.

3. The method of claim 1, wherein the authentication of the user in relation to the vehicle by a proof of identity of the user comprises at least one of the following operations:
providing a digital identity which is uniquely allocated to the user; and
linking the digital identity to the mobile terminal device, wherein the cryptographically secured secret on the mobile terminal device comprises information relating to the digital identity of the user.

4. The method of claim 3, wherein the digital identity comprises a user account and/or an identification number and/or the linking of the digital identity to the mobile terminal device comprises at least one of the following operations:
login of the user into a user account via the mobile terminal device; and
input of the identification number on the mobile terminal device.

5. The method of claim 1, wherein the proof of identity is provided using biometric features of the user or data derived therefrom.

6. The method of claim 1, wherein providing the cryptographically secured authorization file for the vehicle and/or checking the cryptographically secured authorization file by the vehicle is/are initiated by an event.

7. The method of claim 1, wherein the cryptographically secured authorization file is cryptographically signed and/or cryptographically encrypted.

8. The method of claim 1, wherein the cryptographically secured authorization file further comprises information relating to the identity of the vehicle and/or the identity of the authenticated user.

9. The method of claim 1, wherein the cryptographically secured authorization file is provided to the vehicle by the mobile terminal device and/or a different mobile data medium.

10. The method of claim 1, wherein the cryptographically secured authorization file is provided to the vehicle by a central computer.

11. The method of claim 1, wherein the vehicle at least temporarily stores received cryptographically secured authorization files.

12. The method of claim 1, further comprising:
creating the cryptographically secured authorization file by the mobile terminal device; and
providing the cryptographically secured authorization file for a third-party device by the mobile terminal device.

13. The method of claim 1, further comprising
checking by the central computer the cryptographically secured authorization file which has been provided to the vehicle.

14. A communication system for access management of a vehicle, the system comprising:
an authentication device configured to authenticate a user in relation to the vehicle by a proof of identity of the user,
wherein the communication system carries out a method for access management of a vehicle, the method comprising:
authenticating the user for managing access to the vehicle by a proof of identity of the user, wherein the proof of identity is provided using the cryptographically secured secret on the mobile terminal device;
providing a central computer which communicates with the mobile terminal device and/or the vehicle;
in response to authentication of the user, creating a cryptographically secured authorization file by the central computer, wherein the secured authorization file contains information defining a scope of authenticated user-dependent usage rights specific to the authenticated user, wherein the cryptographically secured authorization file is configured to grant user rights that are independent of the vehicle for which access is being managed; and providing the cryptographically secured authorization file by the central computer to the vehicle to manage access to the vehicle.

15. The communication system of claim 14, wherein the method further comprises:
   checking the cryptographically secured authorization file by the vehicle; and
   enabling vehicle functions based on the provided cryptographically secured authorization file.

16. The communication system of claim 14, wherein the authentication of the user in relation to the vehicle by a proof of identity of the user comprises at least one of the following operations:
   providing a digital identity which is uniquely allocated to the user; and
   linking the digital identity to the mobile terminal device, wherein the cryptographically secured secret on the mobile terminal device comprises information relating to the digital identity of the user.

17. The communication system of claim 16, wherein the digital identity comprises a user account and/or an identification number and/or the linking of the digital identity to the mobile terminal device comprises at least one of the following operations:
   login of the user into a user account via the mobile terminal device; and
   input of the identification number on the mobile terminal device.

18. The communication system of claim 14, wherein the proof of identity is provided using biometric features of the user or data derived therefrom.

19. The communication system of claim 14, wherein providing the cryptographically secured authorization file for the vehicle and/or checking the cryptographically secured authorization file by the vehicle is/are initiated by an event.

20. The communication system of claim 14, wherein the cryptographically secured authorization file is cryptographically signed and/or cryptographically encrypted.

21. The communication system of claim 14, wherein the cryptographically secured authorization file further comprises information relating to the identity of the vehicle and/or the identity of the authenticated user.

22. The communication system of claim 14, wherein the cryptographically secured authorization file is provided to the vehicle by the mobile terminal device and/or a different mobile data medium.

23. The communication system of claim 14, wherein the cryptographically secured authorization file is provided to the vehicle by a central computer.

24. The communication system of claim 14, wherein the vehicle at least temporarily stores received cryptographically secured authorization files.

25. The communication system of claim 14, wherein the method further comprises:
   creating the cryptographically secured authorization file by the mobile terminal device; and
   providing the cryptographically secured authorization file for a third-party device by the mobile terminal device.

26. The communication system of claim 14, wherein the method further comprises
   checking by the central computer the cryptographically secured authorization file which has been provided to the vehicle.

* * * * *